United States Patent
Hsu

(10) Patent No.: US 6,380,648 B1
(45) Date of Patent: Apr. 30, 2002

(54) WHEEL DRUM STRUCTURE OF INNER STATOR PORTION WITH INBUILT SWITCHES

(76) Inventor: Chun-Pu Hsu, No. 19, Wu Chuang Liu Rd., Wu Ku Industrial Park, Taipei Hsien (TW)

( * ) Notice: Subject to any disclaimer, the term of this patent is extended or adjusted under 35 U.S.C. 154(b) by 0 days.

(21) Appl. No.: 09/876,989

(22) Filed: Jun. 11, 2001

(51) Int. Cl.[7] ................................................ H02K 5/22
(52) U.S. Cl. ................ 310/67 A; 310/68 R; 310/68 A; 310/89
(58) Field of Search .............................. 310/67 A, 89, 310/91, 68 B, 68 A, 68 R, 75 C, 67 R, DIG. 6

(56) References Cited

U.S. PATENT DOCUMENTS

| | | | | |
|---|---|---|---|---|
| 5,006,744 A | * | 4/1991 | Archer et al. ................ | 310/89 |
| 5,430,931 A | * | 7/1995 | Fisher et al. .................. | 29/596 |
| 5,543,671 A | * | 8/1996 | Williams .................... | 310/710 |
| 5,932,942 A | * | 8/1999 | Patyket et al. ................ | 310/58 |
| 6,081,056 A | * | 6/2000 | Takagi et al. ................ | 310/89 |
| 6,137,203 A | * | 10/2000 | Jermakian et al. .......... | 310/191 |

* cited by examiner

Primary Examiner—Nestor Ramirez
Assistant Examiner—Thanh Lam
(74) Attorney, Agent, or Firm—Rabin & Berdo, P.C.

(57) ABSTRACT

The present invention proposes an electromotor or generator having an inner stator portion with stator coils and inbuilt switches. The inner stator portion lets an electromotor or generator have $K_E$ and $K_T$ of different levels in the range of low, middle, or high rotation speed. Variations of $K_E$ and $K_T$ let the electromotor or generator obtain characteristics of uniform and high efficient operation and "low rotation speed and high torsion" and "high rotation speed and high horse-power". A maximal hollow inner hole is formed at an inner stator ring portion end. Two end cover plates at the inner ring portion end cover two end faces of the hollow inner hole. The inner ring portion end forms a hollow space after being covered to dispose the switches. The object of the present invention is to resolve complexity and inconvenience of wiring engineering in U.S. patent application Ser. No. 09/848,415: "High Performance Stator Device."

16 Claims, 9 Drawing Sheets

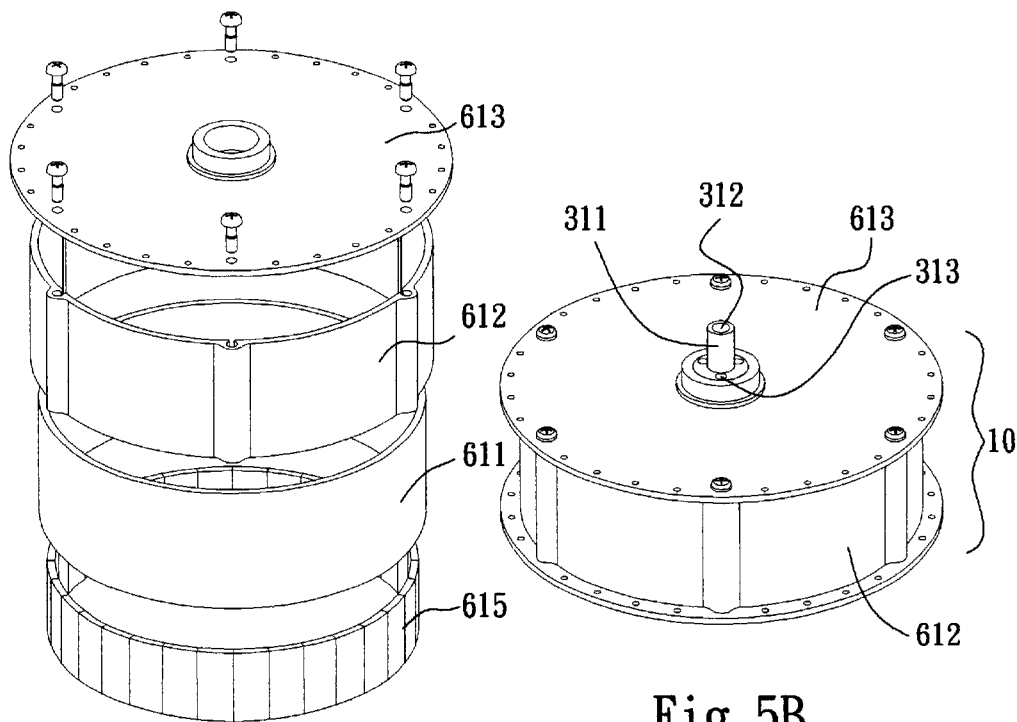
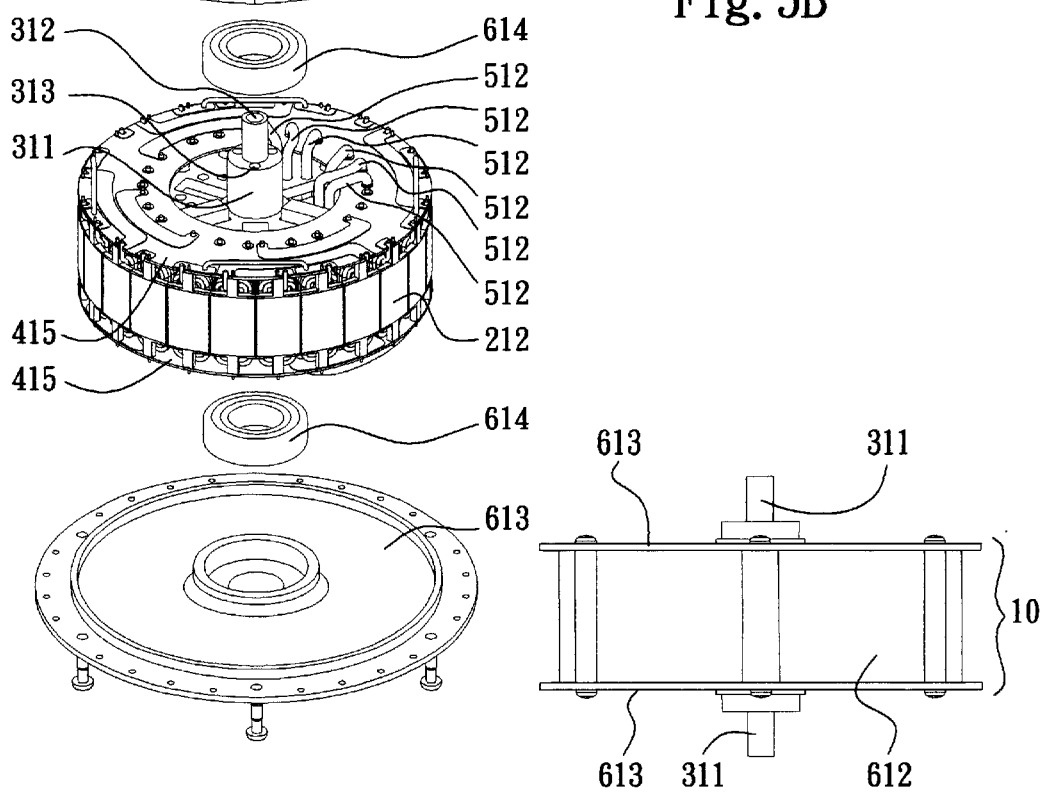
Fig. 5A  Fig. 5B  Fig. 5C

WHEEL DRUM STRUCTURE OF INNER STATOR PORTION WITH INBUILT SWITCHES

FIELD OF THE INVENTION

The present invention relates to a wheel drum structure of an inner stator portion with inbuilt switches and, more particularly, to a wheel drum type electromotor or generator having an inner stator portion with inbuilt switches and a plurality of stator coils.

BACKGROUND OF THE INVENTION

FIG. 1 shows an exploded perspective view of a prior art outer rotor wheel drum type electromotor or generator, whose outer rotor portion 61 comprises a magnet iron yoke ring 611, an outer rotor housing 612, a housing cover plate 613, a bearing 614, and an outer rotor magnet 615 of. The outer rotor portion 61 has an inner stator 71, through holes 312 and 315, and wire heads/tails 419 of coils therein.

In a conventional stator device disclosed in U.S. patent application Ser. No. 09/848,415: "High Performance Stator Device," a stator portion thereof has a plurality of stator coils, which are switched according to the rotation speed of a rotor to generate the torsion coefficient $K_T$ of various kinds of levels. If the $K_T$ is changed timely, an electromotor can obtain the optimal power performance of "low rotation speed and high torsion" and "high rotation speed and high horsepower". Simultaneously, the plurality of stator coils are switched according to the rotation speed of the outer rotor to generate the counter electromotive force coefficient $K_E$ of various kinds of levels. If the $K_E$ is changed timely, an electromotor or generator can maintain the operational characteristic of high efficiency for all operational regions.

However, wire heads/tails of the plurality of stator coils will increase the count of output wire heads/tails of the electromotor or generator several-fold. Therefore, the wiring operation will be complex and inconvenient. The present invention aims to resolve this problem.

A stator portion of a conventional electromotor or generator is formed by winding a single stator coil. Therefore, the torsion coefficient $K_T$ and the counter electromotive force coefficient $K_E$ thereof are consequentially constant values. This can be illustrated with the following formulas.

$$E = K_E \cdot \Omega$$

$$T = K_T \cdot I_a$$

$$K_E = B \cdot D \cdot L \cdot Z / 2$$

$$K_T = B \cdot D \cdot L \cdot Z / 2$$

wherein E is the counter electromotive force voltage (volt), T is the output torsion (N–m), $K_E$ is the counter electromotive force coefficient, $K_T$ is the torsion coefficient, W is the rotation speed of the armature (rad/sec), Ia is the armature current (ampere), B is the magnetic flux density of the gap (gauss), D is the outer diameter of the armature (cm), L is the superimposed thickness (cm), and Z is the total number of turns of conductors.

As can be seen from the above formulas, the counter electromotive force coefficient $K_E$ equals the torsion coefficient $K_T$, and the values of $K_E$ and $K_T$ are proportional to the total number of turns of conductors Z. Therefore, if the total number of turns of conductors Z of a coil in an identical electromotor or generator changes, the values of the counter electromotive force coefficient $K_E$ and the torsion coefficient $K_T$ vary accordingly.

If an electromotor or generator is to be operated at a high rotation speed with a certain counter electromotive force voltage E, the counter electromotive force coefficient $K_E$ is inevitably lower. Therefore, the output torsion T is necessarily lower. If a larger torsion T is required, it is necessary to increase the armature current $I_a$. However, a too large $I_a$ is not good to the operational efficiency of the electromotor. This can be known from the following formula.

$$P = I^2 \cdot R$$

wherein P is the dissipated power of the coil of the stator portion, I is the armature current, and R is the impedance of the coil. Therefore, if the torsion of an electromotor is increased by increasing the armature current, the dissipated power of the coil of the stator portion will increase squarely, and heat will be generated in the impedance of the coil. The impedance of the coil will correspondingly rise due to the temperature rise of the metallic coil. This vicious circle will let the electromotor or generate operate in an environment of high temperature, hence resulting in a worse output efficiency.

SUMMARY OF THE INVENTION

A stator portion of a conventional electromotor or generator is formed by winding a single stator coil. Therefore, the torsion coefficient $K_T$ and the counter electromotive force coefficient $K_E$ thereof are consequentially constant values. The operational region thereof having better efficiency is much limited. In the present invention, the area of wire grooves of an inner stator portion is deepened and enlarged, and a plurality of coil windings of various turns are disposed therein. A maximal hollow inner hole is formed at an inner ring portion end of the inner stator. Two end cover plates at the inner ring portion end cover two end faces of the hollow inner hole. The inner ring portion end forms a hollow space after being covered to dispose switches therein. Complex wiring operations of the plurality of the stator coils and the switches are thus completed in the structure. By means of systematized management and control, the turns of the inner stator coils can have diversified variations. Variations of the turns of the coils can change the values of the counter electromotive force coefficient $K_E$ and the torsion coefficient $K_T$ of the electromotor or generator. If the values of the $K_E$ and $K_T$ are varied timely, the highest rotation speed of the electromotor will change accordingly, or the highest output voltage of the generator will change accordingly. Therefore, as shown in FIGS. 8A and 8B, because a stator portion has a plurality of values of $K_E$ and $K_T$, the operational region of optimal efficiency generated by each of the values of $K_E$ and $K_T$ can be included in the range of low, middle, or high rotation speed. In other words, the characteristic of high efficiency EFF value can be maintained within a wide range of operational rotation speed. Moreover, if the electromotor needs to work within the range of low rotation speed, a highest value of the torsion coefficient $K_T$ can be obtained once a stator coil of the highest turns is switched to. Contrarily, if the electromotor needs to work within the range of high rotation speed, a lowest value of the counter electromotive force coefficient $K_E$ can be obtained once a stator coil of the least turns is switched to. Therefore, by switching the stator coils of different turns, an electromotor can obtain the optimal power output characteristic of "low rotation speed and high torsion" and "high rotation speed and high horsepower".

An electromotor or generator of the present invention can acquire the operational characteristic of uniform and high efficiency within a wide operational range and the optimal power characteristic of "low rotation speed and high torsion" and "high rotation speed and high horsepower". Moreover, excess space at the ring portion end of the inner stator can be fully exploited. Furthermore, complexity and inconvenience of wiring operations occurring in the prior art can be resolved under the premise that the original volume of a wheel drum type electromotor or generator is not enlarged, hence resolving complexity and inconvenience of wiring engineering in U.S. patent application Ser. No. 09/848,415: "High Performance Stator Device."

The various objects and advantages of the present invention will be more readily understood from the following detailed description when read in conjunction with the appended drawing, in which:

BRIEF DESCRIPTION OF THE DRAWINGS

FIG. 5A shows a perspective view of an assembled inner stator portion and an exploded perspective view of an outer rotor portion;

FIG. 5B is a perspective view of an assembled wheel drum according to an embodiment of the present invention;

FIG. 5C is a side view of an assembled wheel drum according to an embodiment of the present invention;

DETAILED DESCRIPTION OF THE PREFERRED EMBODIMENTS

Figure 1:
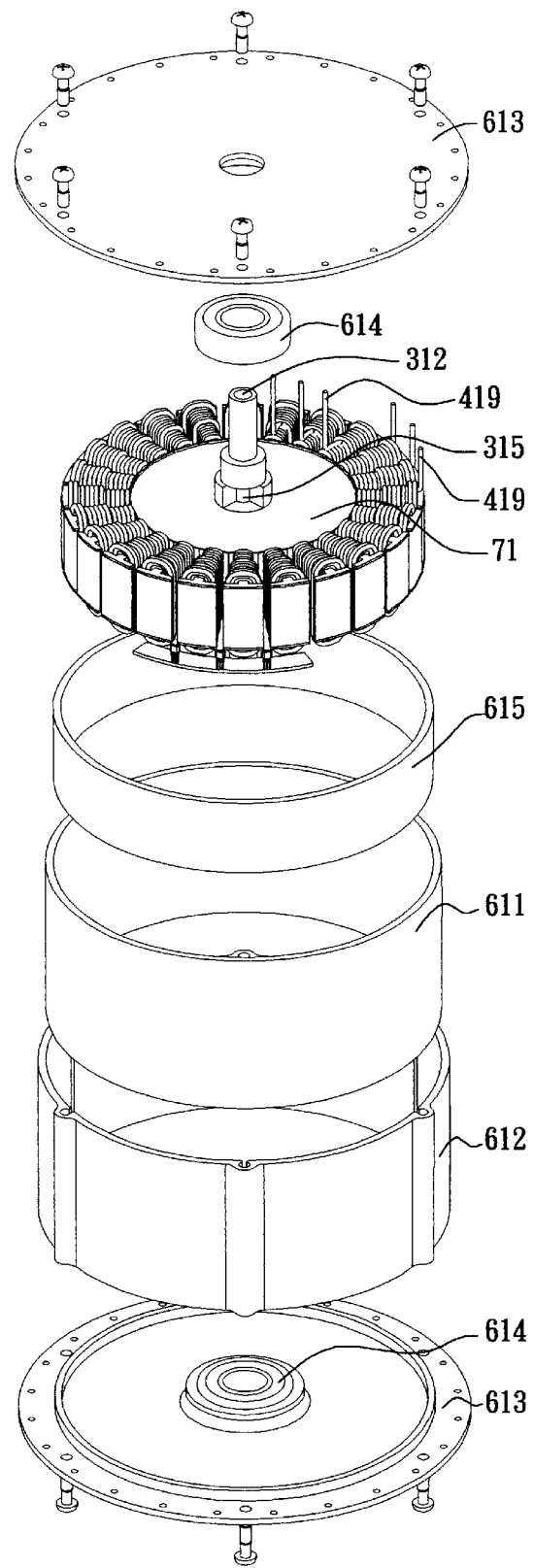
FIG. 1 is an exploded perspective view of a prior art outer rotor wheel drum type electromotor or generator.
Figure 2:
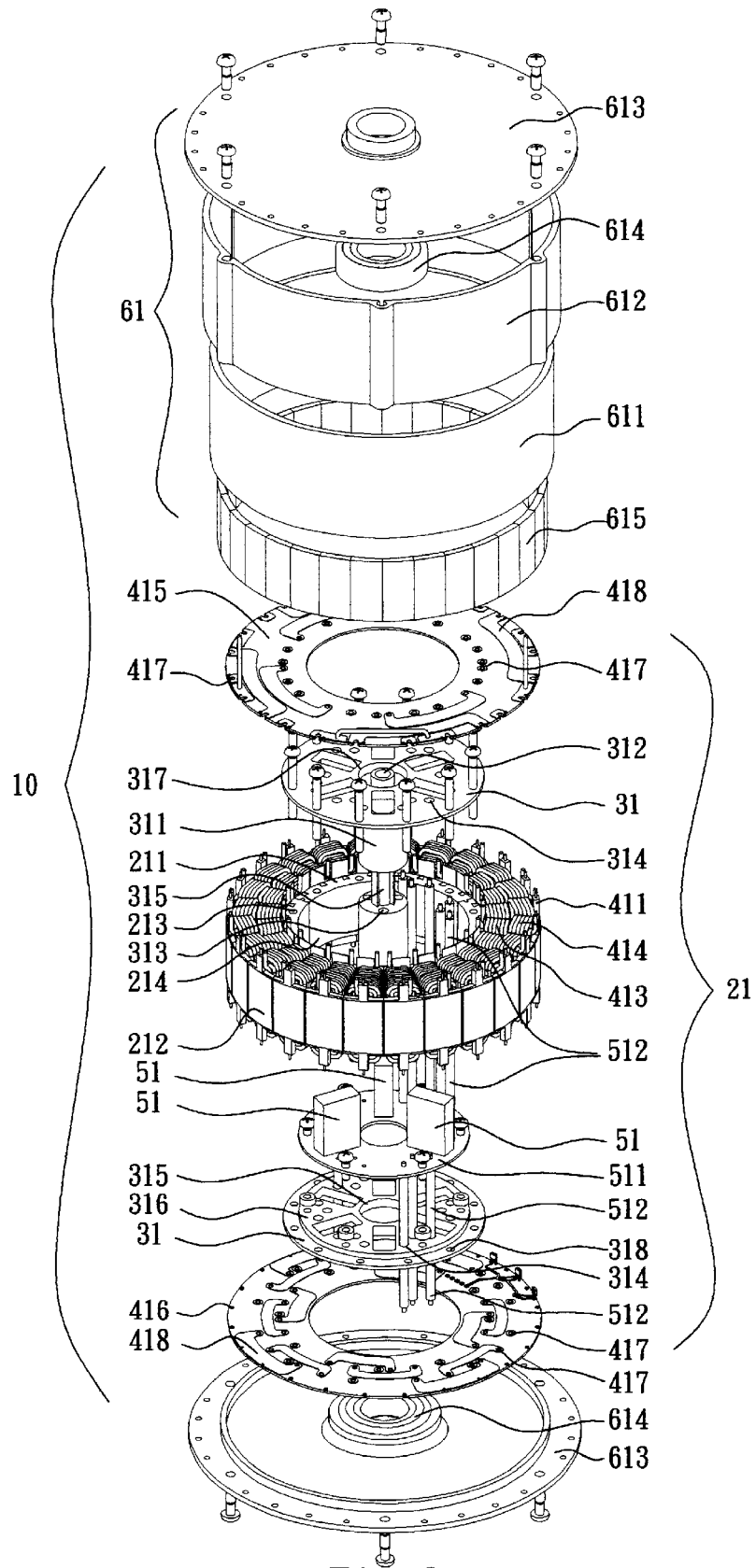
FIG. 2 is an exploded perspective view according to a first embodiment of the present invention.
Figure 3:
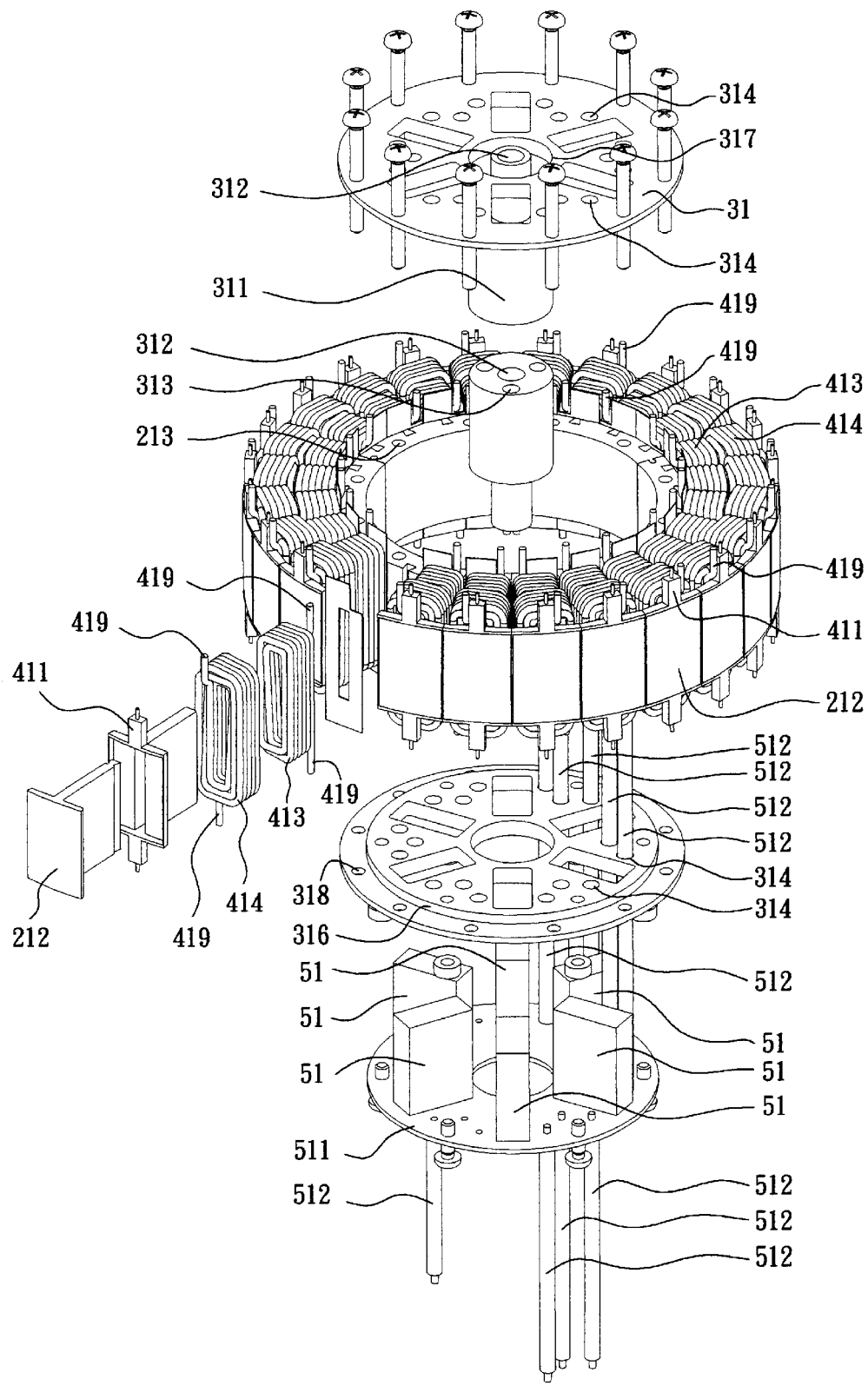
FIG. 3 is an exploded perspective view according to a second embodiment of the present invention with switches disposed in a hollow circular space at an inner ring portion end of a stator portion thereof.
Figure 4A:
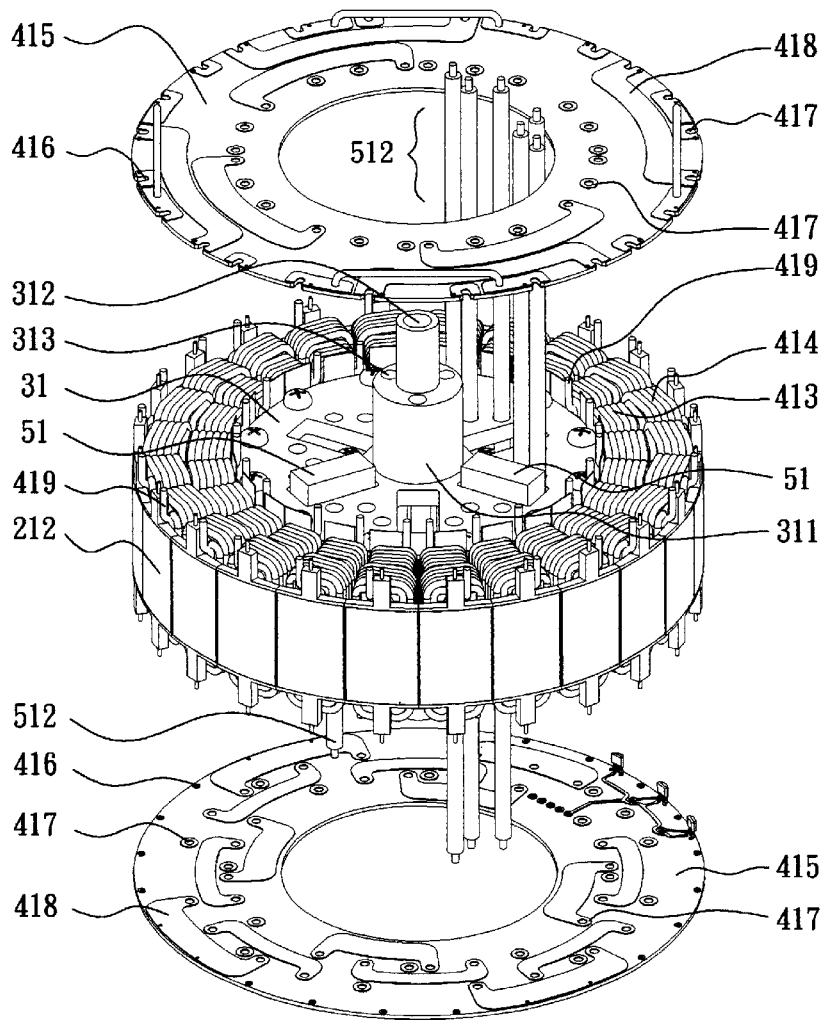
FIG. 4A is an exploded perspective view showing the wiring of switches and a stator coil circuit board according to an embodiment of the present invention.
Figure 4B:
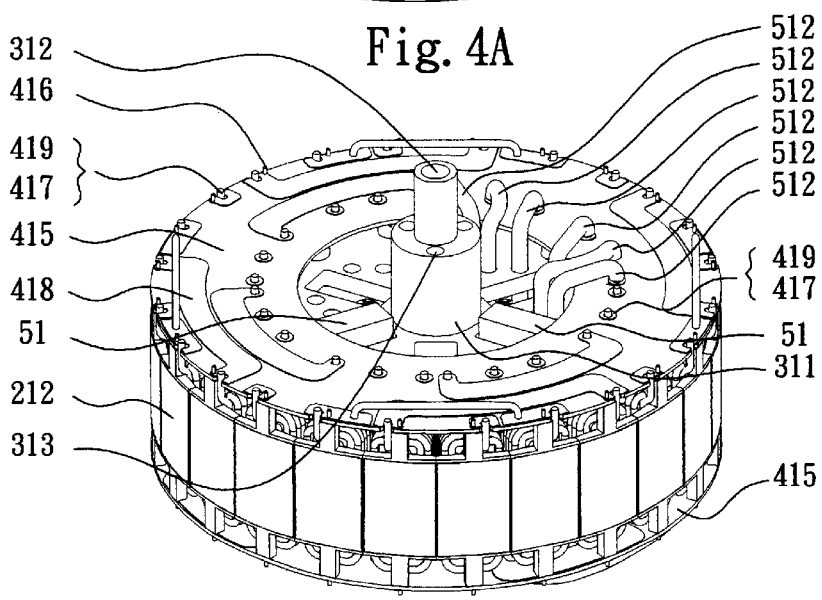
FIG. 4B is a perspective view showing the wiring of switches and a stator coil circuit board according to an embodiment of the present invention.
Figures 6A, 6B:
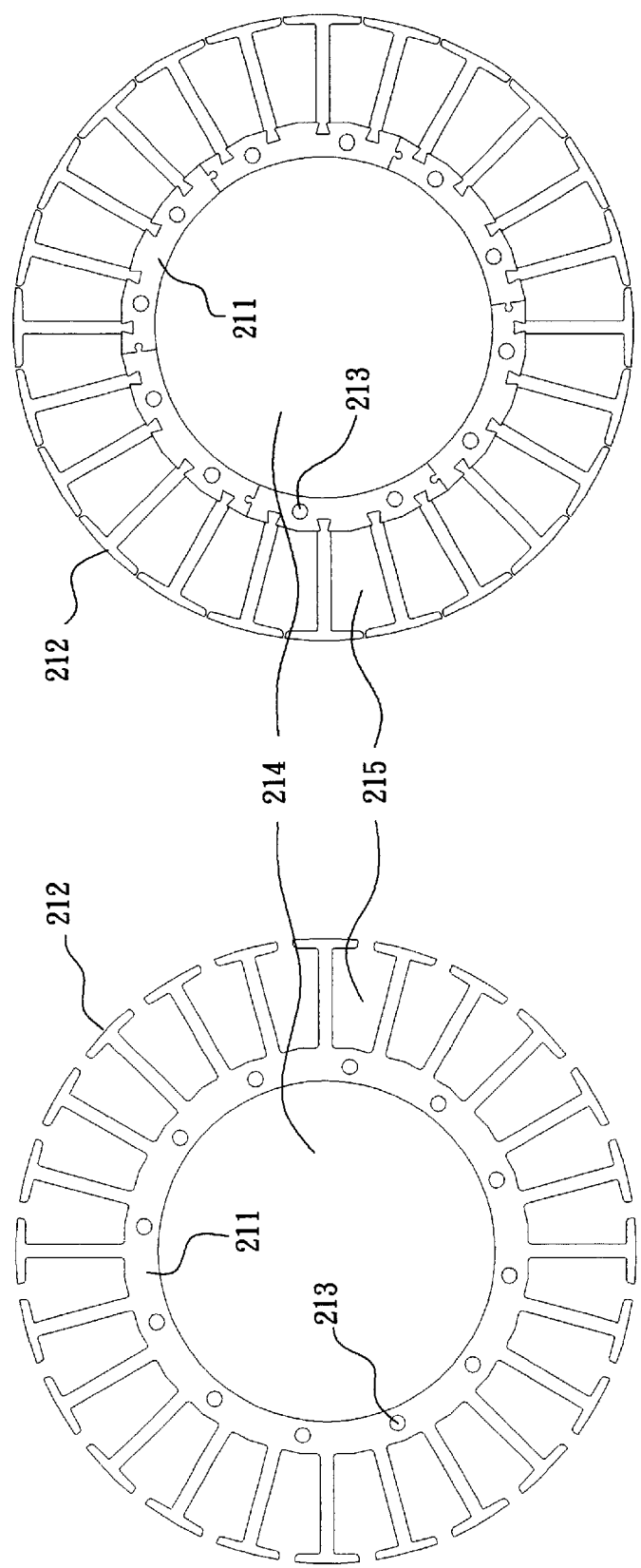
FIGS. 6A and 6B are cross-sectional views of an integrally formed inner stator and an assembled inner stator, respectively.
Figure 7A:
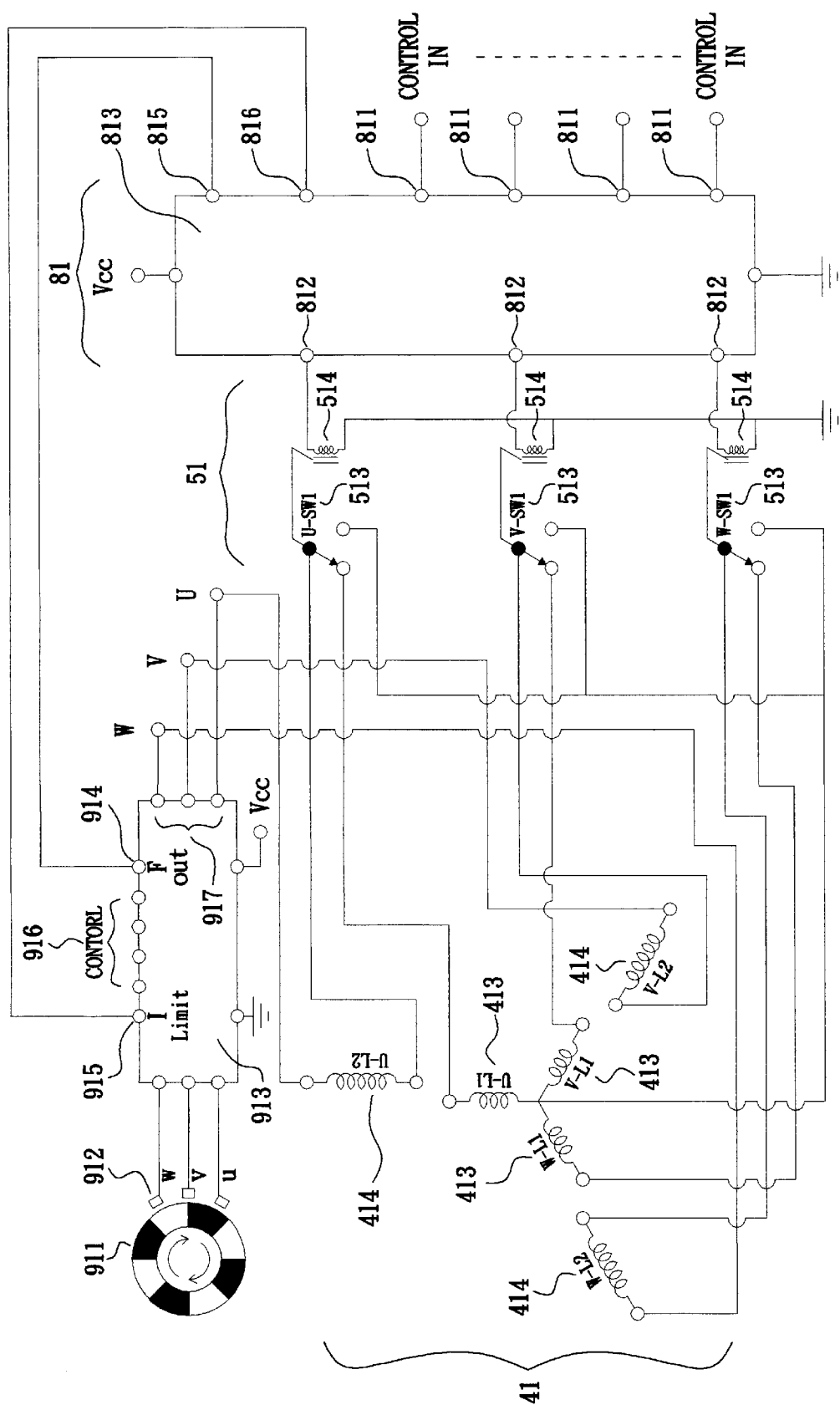
FIG. 7A is a diagram showing the wiring of two three-phase Y-type coil windings with two kinds of different turns (L2) and (L1+L2) switched.
Figure 7B:
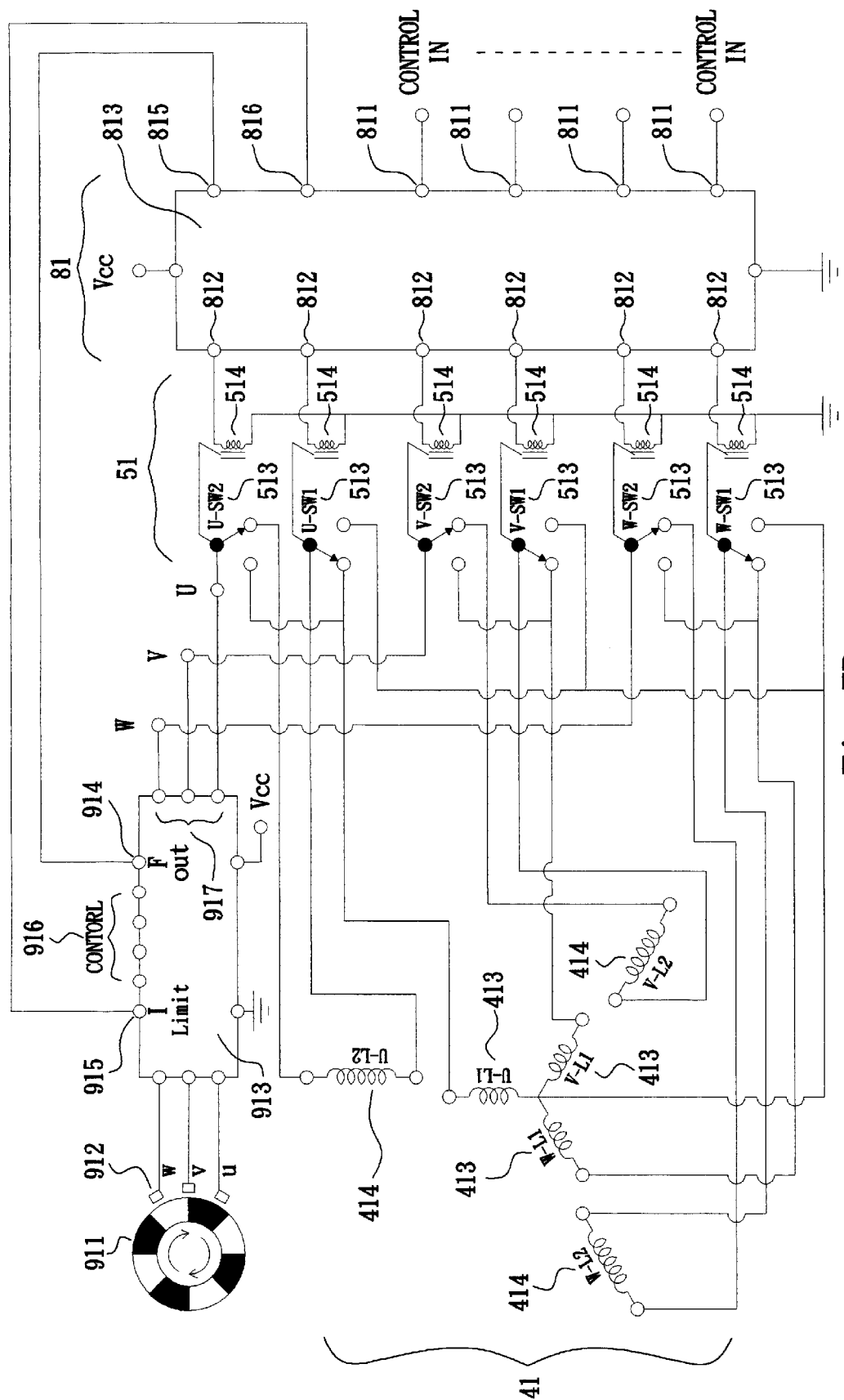
FIG. 7B is a diagram showing the wiring of two three-phase Y-type coil windings with three kinds of different turns (L1), (L2), and (L1+L2) switched.
Figure 8A:
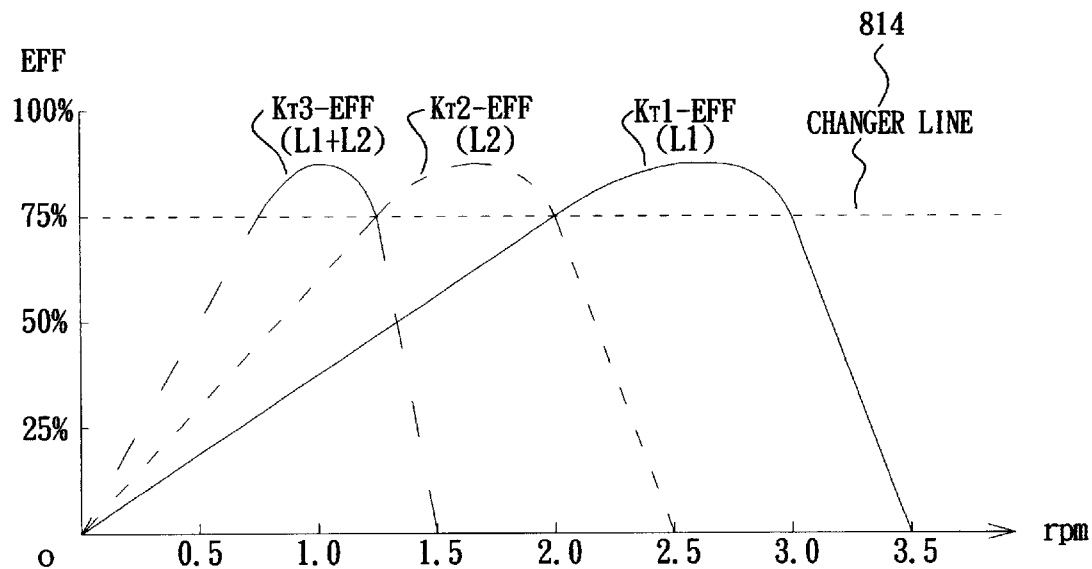
FIGS. 8A and 8B show graphs of the operational efficiency having a wide rotation speed range of high efficiency by combining three values of the torsion coefficient $K_T$ after two three-phase Y-type coil windings with three kinds of different turns (L1), (L2), and (L1+L2) are switched.
Figure 8B:
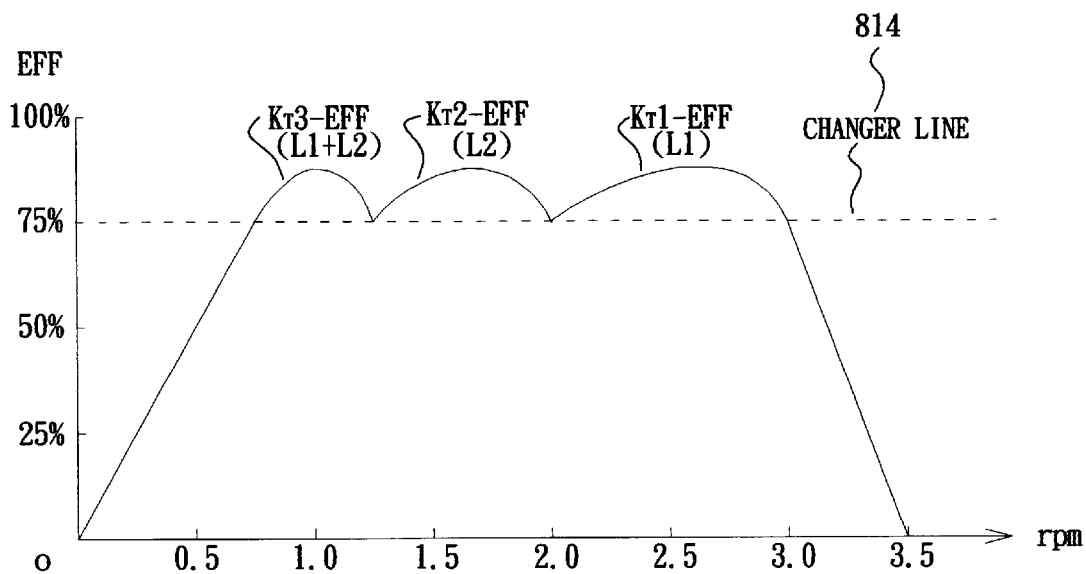

As shown in FIGS. 2 to 8A and 8B, a wheel drum structure of an inner stator with inbuilt switches 10 of the present invention comprises an inner stator portion 21, a stator coil circuit board 415, a stator ring portion end cover plate 31, a plurality of switches 51, a wheel drum supporting shaft 311, and an outer rotor portion 61. The inner stator portion 21 is formed by drawing and stacking silicon steel sheets with magnetic permeability. A ring portion end thereof 211 forms a maximal hollow space 214. A plurality of positioning through holes 213 are provided on the periphery of the inner ring portion end 211 for positioning and assembly. Wire grooves 215 are disposed to receive a plurality of stator coils 41. An open circuit is formed between windings 413 and 414 of each of the stator coils.

A stator coil circuit board 415 is formed of a copper foil circuit board with circuit board positioning holes 416 and circuit copper foil lines 418 disposed thereon. The stator coil circuit board 415 provides a plurality of solder holes 417 so that wire heads/tails 419 of the plurality of stator coils 413 and 414 can pass through to be soldered and fixed.

The outer edge end of the end cover plate 31 corresponding to the space 214 of the inner ring portion end 211 forms a flange end 316 to cover over upper and low end faces of the inner ring portion end 211. The end cover plate 31 has a plurality of positioning holes 318. The outer periphery of the flange end 316 has a plurality of positioning holes 317 corresponding to the positioning through holes 213 of the inner ring portion end 211. The positioning holes 317 are correspondingly locked with the concentric positioning through holes of the inner ring portion end 211 with the hollow space 214 formed in between. The hollow space 214 is provided to dispose the plurality of switches 51 therein. The panel of the end cover plate 31 has a plurality of through holes 314, which are penetrated through by connection wires 512 between the switches 51 and the stator coil circuit board 415. The central end of the two end cover plates 31 should correspond to the common center of the outer rotor portion 61 and the inner stator portion 21 of an electromotor to form a concentric positioning hole 317. The concentric positioning hole 317 is provided so that a wheel drum supporting shaft 311 can be pressed and joined therein.

The plurality of switches 51 are soldered and fixed onto a switch circuit board 511, which should be locked at one side of the above end cover plates 31 with the switches 51 disposed in the space 214 of the inner ring portion end 211. Control contacts 513 of the plurality of switches 51 are soldered and connected to the through holes 314 of the cover end plate 31 and the wire heads/tails 419 of the stator coils 413 and 414 of the stator coil circuit board 415 to form coil windings of various turns. The switches 51 are controlled by switch signal output terminals 812 of the switch control system 81 to switch the states of the contacts 513, thereby forming coil windings of various kinds of variable turns. In other words, an electromotor or generator has various kinds of variable values of the counter electromotive force coefficient $K_E$ and the torsion coefficients $K_T$.

The control system 81 comprises control signal input terminals 811, switch signal output terminals 812, a management and control system 813, a rotation speed detection signal input terminal 815, and a current detection signal input terminal 816. The control system 81 is also connected to an operational tachometer 911, a rotation speed detector 912, a three-phase coil controller 913, an operational rotation speed detection terminal 914, an operational current detection terminal 915, and control contacts 916.

The wheel drum supporting shaft 311 is pressed and joined in the concentric positioning hole 317 of the central end of the end cover plates 31. The supporting shaft 311 protrudes out of a housing cover plate 613 to fix and support an electromotor or generator. More than one through holes 312, 313, and 315 are disposed at the center of and beside the supporting shaft 311 so that switches 51 can switch circuit output of the winding 413+414 of the controlled stator coils 413 and 414. The switch control system 81 is also connected to the switches 51 via the through holes 314.

The outer rotor portion 61 comprises a bearing 61, whose inner bore is sleeved on the wheel drum supporting shaft 311 and whose outer bore is sleeved in the housing cover plate 613 of the outer rotor portion 61. The housing cover plate 613 grips and locks an outer rotor magnet 615 and a magnet iron yoke ring 611 to operate an armature with the inner stator portion 21.

The plurality of stator coils 413 and 414 in the wire grooves 215 of the inner stator portion 21 can be formed by separately winding one groove after another and insulatively disposed in each stator tooth end 212.

The plurality of stator coils 413 and 414 in the wire grooves 215 of the inner stator portion 21 can be formed by concentratedly winding across grooves and insulatively disposed in the wire grooves 215.

The inner ring portion end 211 and the stator tooth end 212 of the inner stator portion 21 can be separately formed by drawing and stacking. The stator tooth end 211 is then sleeved with a wire groove seat 411 and a plurality of stator coils 413 and 414 and then assembled at the inner ring portion end 2211 to form the whole inner stator portion 21.

The inner ring portion end 211 and the stator tooth end 212 of the inner stator portion 21 can also be integrally formed by drawing and stacking. The plurality of stator coils 413 and 414 are then insulatively disposed in the wire grooves 215.

The switches 51 can be relays with contacts. Output instructions of the switch signal output terminals 812 of the switch control system 81 let the contacts 513 of the relays and the plurality of coils 413 and 414 form a stator coil winding network of various kinds of variable turns.

The switches can also be electronic semiconductors without contacts. Output instructions of the switch signal output terminals 812 of the switch control system 81 let the contacts 513 of the electronic semiconductors and the plurality of coils 413 and 414 form a stator coil winding network of various kinds of variable turns.

The plurality of stator coils 413 and 414 can be connected in three-phase Y shape to be then managed and switched by the switches 51 and the control system 81.

The plurality of stator portion coils 413 and 414 can be connected in three-phase Δ shape to be then managed and switched by the switches 51 and the control system 81.

The plurality of stator portion coils 413 and 414 can also be of single-phase type to be managed and switched by the switches 51 and the control system 81.

The total count of the switches 51 can be determined according to the amount of various kinds of turns of the switched stator coils 413 and 414. For a single-phase coil, if L1 turns (413) and L2 turns (414) are required, a switch 51 is required to control the change of two kinds of turns. For a three-phase coil winding, three switches 51 are required.

The total count of the switches 51 can be determined according to the amount of various kinds of turns of the switched stator coils 413 and 414. For a single-phase coil, if L1 turns (413), L2 turns (414), and L1+L2 turns (L1 in series with L2) are required, two switches 51 are required to control the change of three kinds of turns. For a three-phase coil winding, six switches 51 are required.

The total count of the switches 51 can also be determined according to the amount of various turns of the switched stator coils 413 and 414. The total number of the switches varies because of the amount of various counts of turns of the switched stator coils 413 and 414 and different types of contacts of the switches 51.

The inner stator portion 21 can be an inner stator portion of an electromotor, and the plurality of stator coils 41 are exciting coils of the electromotor.

The inner stator portion 21 can also be an inner stator portion of a generator, and the plurality of stator coils 41 are induction coils of the generator.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A wheel drum structure of an inner stator with inbuilt switches, comprising:

an inner stator portion, an inner ring portion end thereof forming a hollow space, said inner stator portion also having wire grooves to receive a plurality of stator coils;

a stator coil circuit board providing a plurality of solder holes so that wire heads/tails of said plurality of stator coils can pass through to be soldered and fixed;

two cover plates covering over upper and lower end faces of said inner ring portion end, a central end of said two end cover plates corresponding to a common center of an outer rotor portion and said inner stator portion of a motor to form a concentric positioning hole;

a plurality of switches soldered and fixed on a switch circuit board, said switch circuit board being locked at one side of said end cover plates, said plurality of switches being disposed in said hollow space of said inner ring portion end of said inner stator portion;

a wheel drum supporting shaft pressed and joined in said central positioning hole at the central end of said end cover plates, said supporting shaft protruding out of a housing cover plate of the wheel drum, said supporting shaft having more than one through holes and providing said switches circuit outputs of windings of said stator coils, said switch control system being connected to said switches via said through holes; and an outer rotor portion comprising a bearing whose inner bore is sleeved on said wheel drum supporting shaft and whose outer bore is sleeved in a housing cover plate thereof, said housing cover plate gripping and locking an outer magnet and a magnet iron yoke ring to operate an armature with said inner stator portion.

2. The wheel drum structure of an inner stator with inbuilt switches as claimed in claim 1, wherein said plurality of stator coils in said wire grooves of said inner stator portion are formed by separately winding one groove after another and insulatively disposed in each stator tooth end.

3. The wheel drum structure of an inner stator with inbuilt switches as claimed in claim 1, wherein said plurality of stator coils in said wire grooves of said inner stator portion are formed by concentratedly winding across grooves and insulatively disposed in said stator wire grooves.

4. The wheel drum structure of an inner stator with inbuilt switches as claimed in claim 1, wherein said inner ring portion end and a stator tooth end of said inner stator portion are separately formed by drawing and stacking, said stator tooth end being sleeved with a wire groove seat and said plurality of stator coils and then assembled at said inner ring portion end to form said inner stator portion.

5. The wheel drum structure of an inner stator with inbuilt switches as claimed in claim 1, wherein said inner ring portion end and a stator tooth end of said inner stator portion are integrally formed by drawing and stacking, and said plurality of stator coils are then insulatively disposed in said wire grooves.

6. The wheel drum structure of an inner stator with inbuilt switches as claimed in claim 1, wherein said switches are relays with contacts, and output instructions of said switch control system let the contacts of said relays and said plurality of coils form a winding network of said stator coils of various kinds of variable turns.

7. The wheel drum structure of an inner stator with inbuilt switches as claimed in claim 1, wherein said switches are electronic semiconductors without contacts, and output instructions of said switch control system let the contacts of said electronic semiconductors and said plurality of coils form a winding network of said stator coils of various kinds of variable turns.

8. The wheel drum structure of an inner stator with inbuilt switches as claimed in claim 1, wherein said plurality of stator coils are connected in three-phase Y shape to be managed and switched by said switches and said control system.

9. The wheel drum structure of an inner stator with inbuilt switches as claimed in claim 1, wherein said plurality of stator coils are connected in three-phase Δ shape to be managed and switched by said switches and said control system.

10. The wheel drum structure of an inner stator with inbuilt switches as claimed in claim 1, wherein said plurality of stator coils are of single-phase type to be managed and switched by said switches and said control system.

11. The wheel drum structure of an inner stator with inbuilt switches as claimed in claim 1, wherein the total count of said switches is determined according to the amount of various turns of said switched stator coils, a switch being required to control the change of two kinds of turns if L1 turns or L2 turns and L1+L2 turns formed of L1 in series with L2 are required for a single-phase coil, three switches being required for a three-phase coil winding.

12. The wheel drum structure of an inner stator with inbuilt switches as claimed in claim 1, wherein the total count of said switches is determined according to the amount of various turns of said switched stator coils, two switches being required to control the change of three kinds of turns if L1 turns, L2 turns, and L1+L2 turns formed of L1 in series with L2 are required for a single-phase coil, six switches being required for a three-phase coil winding.

13. The wheel drum structure of an inner stator with inbuilt switches as claimed in claim 1, wherein the total count of said switches is determined according to the amount of various turns of said switched stator coils.

14. The wheel drum structure of an inner stator with inbuilt switches as claimed in claim 1, wherein said inner stator portion is an inner stator portion of an electromotor, and said plurality of stator coils are exciting coils of said electromotor.

15. The wheel drum structure of an inner stator with inbuilt switches as claimed in claim 1, wherein said inner stator portion is an inner stator portion of a generator, and said plurality of stator coils are induction coils of said generator.

16. The wheel drum structure of an inner stator with inbuilt switches as claimed in claim 1, wherein an outer edge end of said end cover plate of said inner stator portion corresponding to said hollow space of said inner ring portion end forms a flange end to cover over upper and low end faces of said inner ring portion end, the outer periphery of said flange end having a plurality of positioning holes correspondingly locked with said two end faces of said inner ring portion end to form said hollow space, control contacts of said plurality of switches in said hollow space being soldered and connected to wire heads/tails of said stator coils of a stator coil circuit board to form a coil winding network of various turns, said switches being controlled by switch signal output terminals of said switch control system to switch the states of said contacts, thereby forming the coil winding network of various kinds of variable turns, i.e., an electromotor or generator having various kinds of variable values of the counter electromotive force coefficient $K_E$ and the torsion coefficients $K_T$.

* * * * *